Dec. 26, 1933.                W. T. HANNA                1,940,798
                    RUNNING GEAR FOR ROAD VEHICLES
             Original Filed Aug. 1, 1930    6 Sheets-Sheet 1
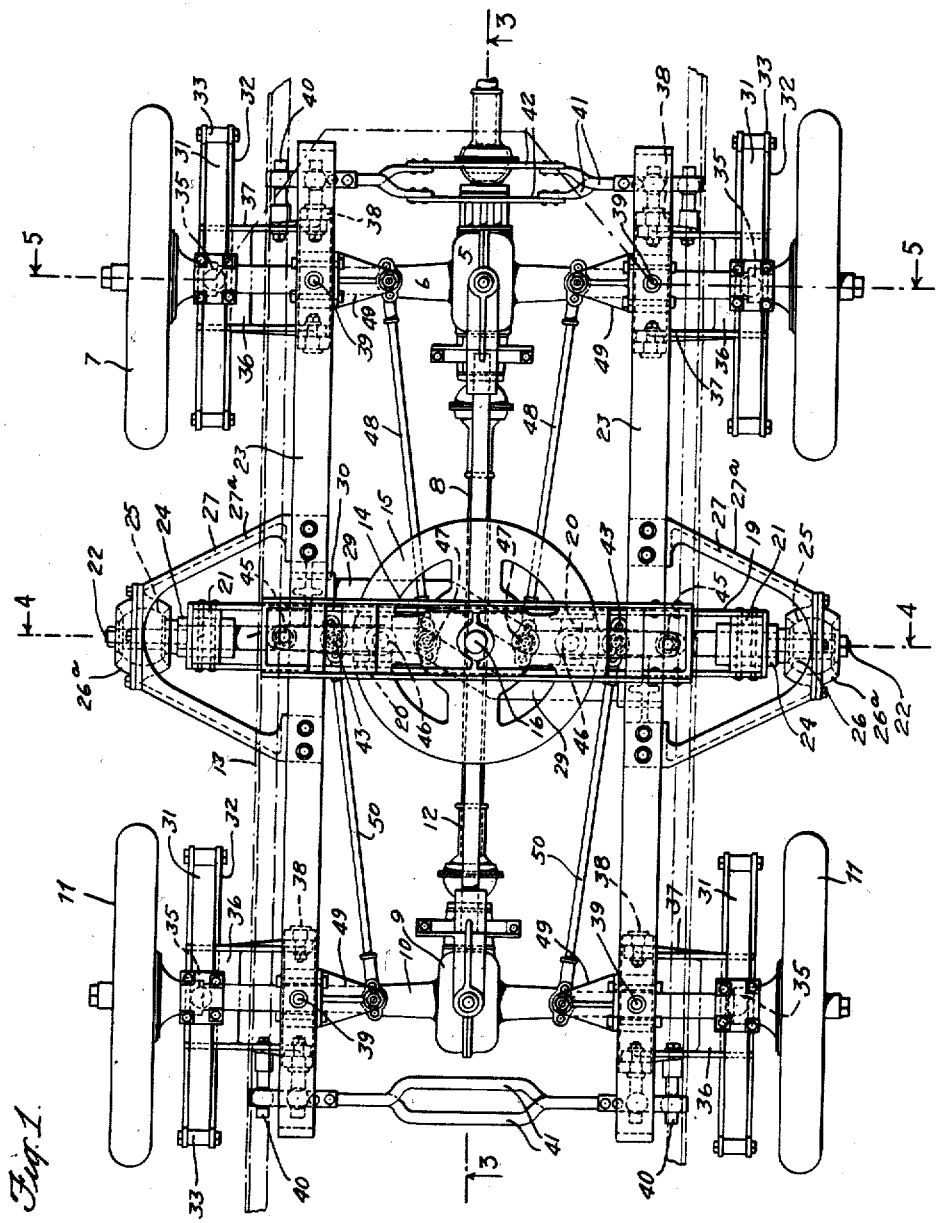
INVENTOR
WILLIAM T. HANNA
ATTORNEY

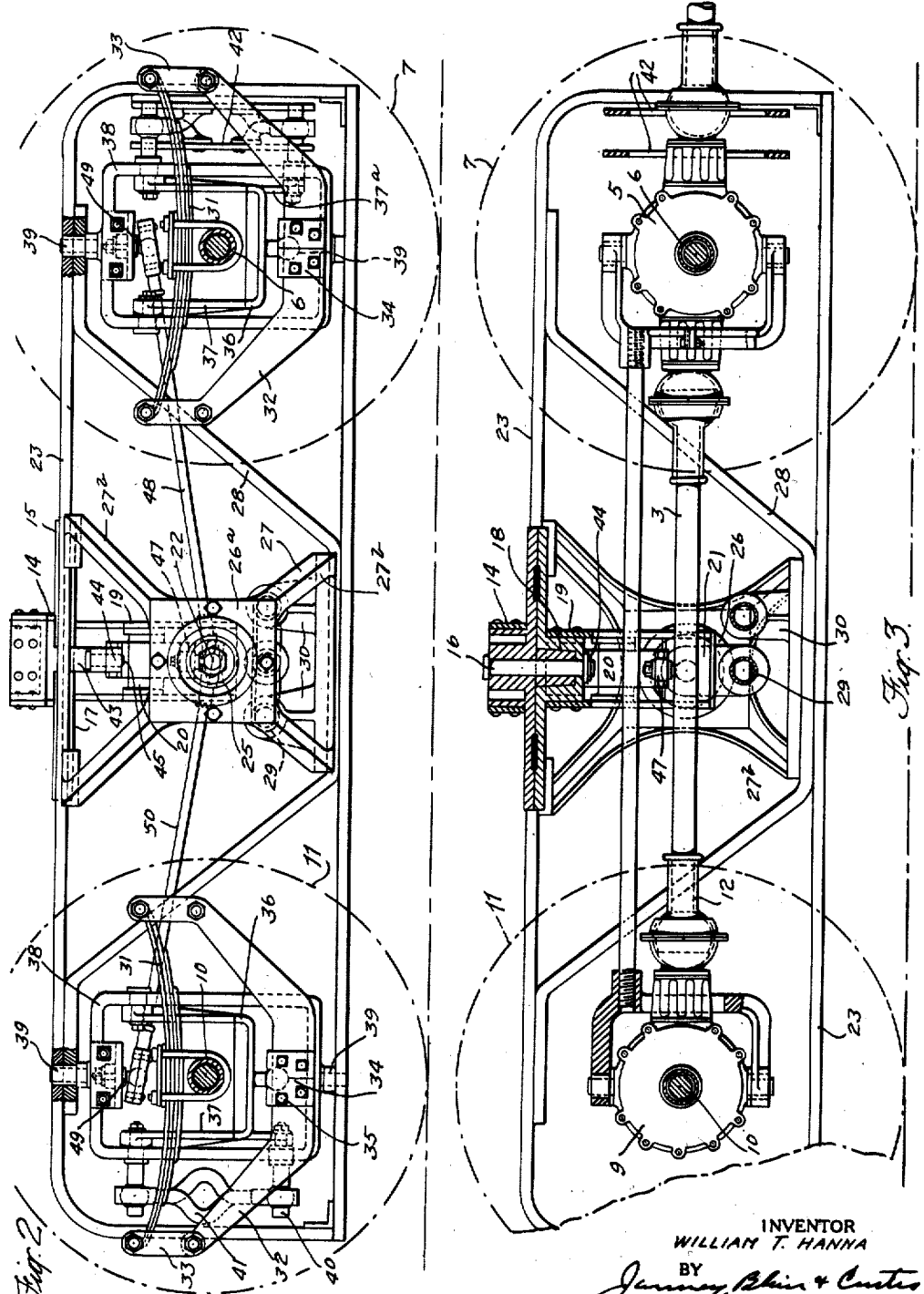

Dec. 26, 1933.  W. T. HANNA  1,940,798
RUNNING GEAR FOR ROAD VEHICLES
Original Filed Aug. 1, 1930    6 Sheets-Sheet 3
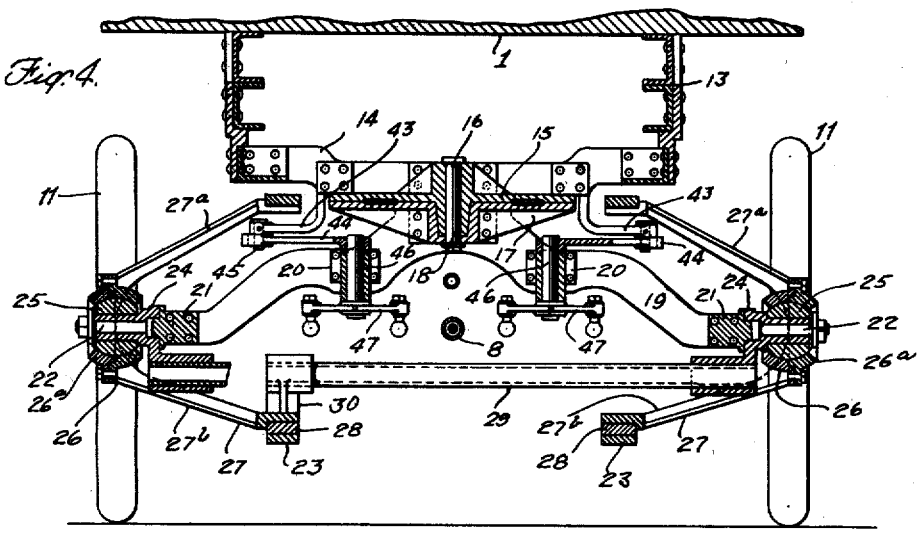
INVENTOR
WILLIAM T. HANNA
BY
ATTORNEY

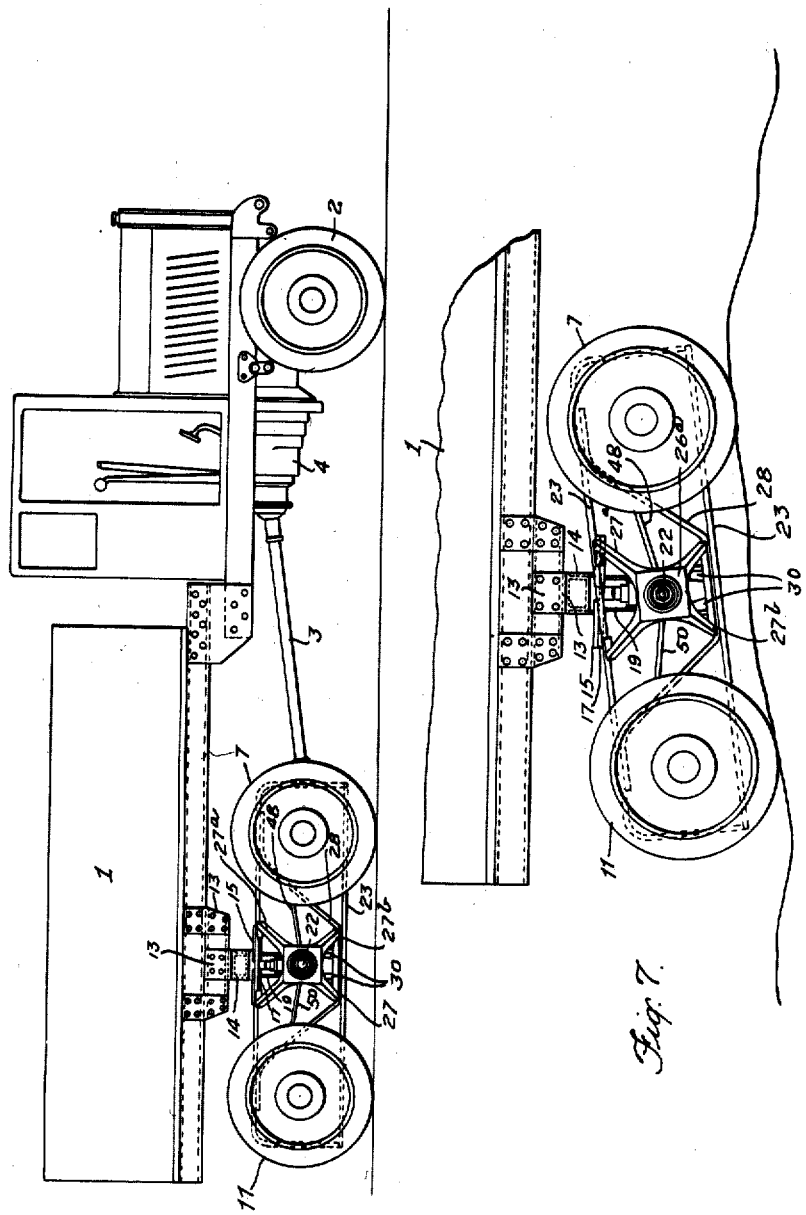

Dec. 26, 1933.  W. T. HANNA  1,940,798
RUNNING GEAR FOR ROAD VEHICLES
Original Filed Aug. 1, 1930    6 Sheets-Sheet 5
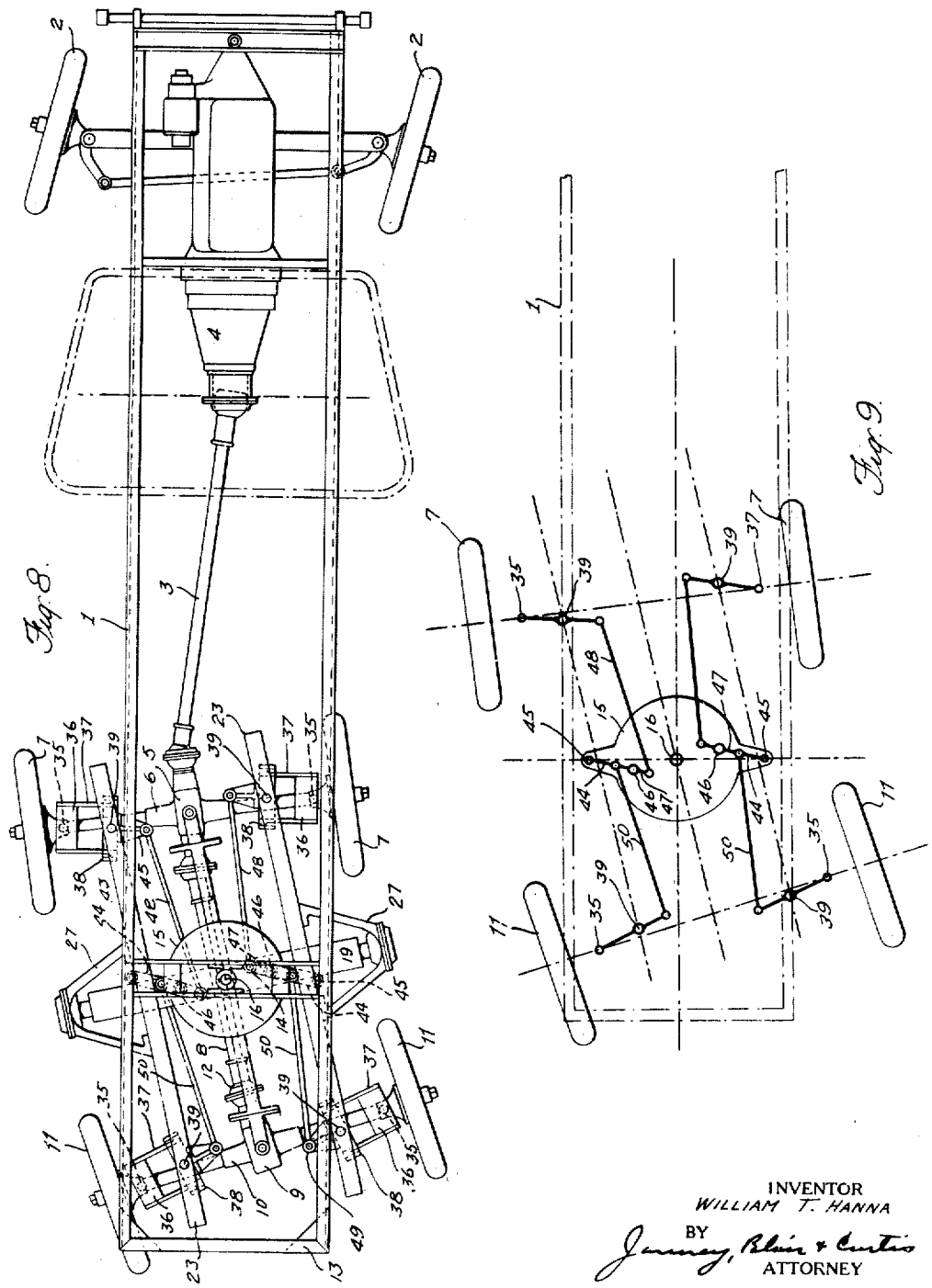
INVENTOR
WILLIAM T. HANNA
BY
ATTORNEY

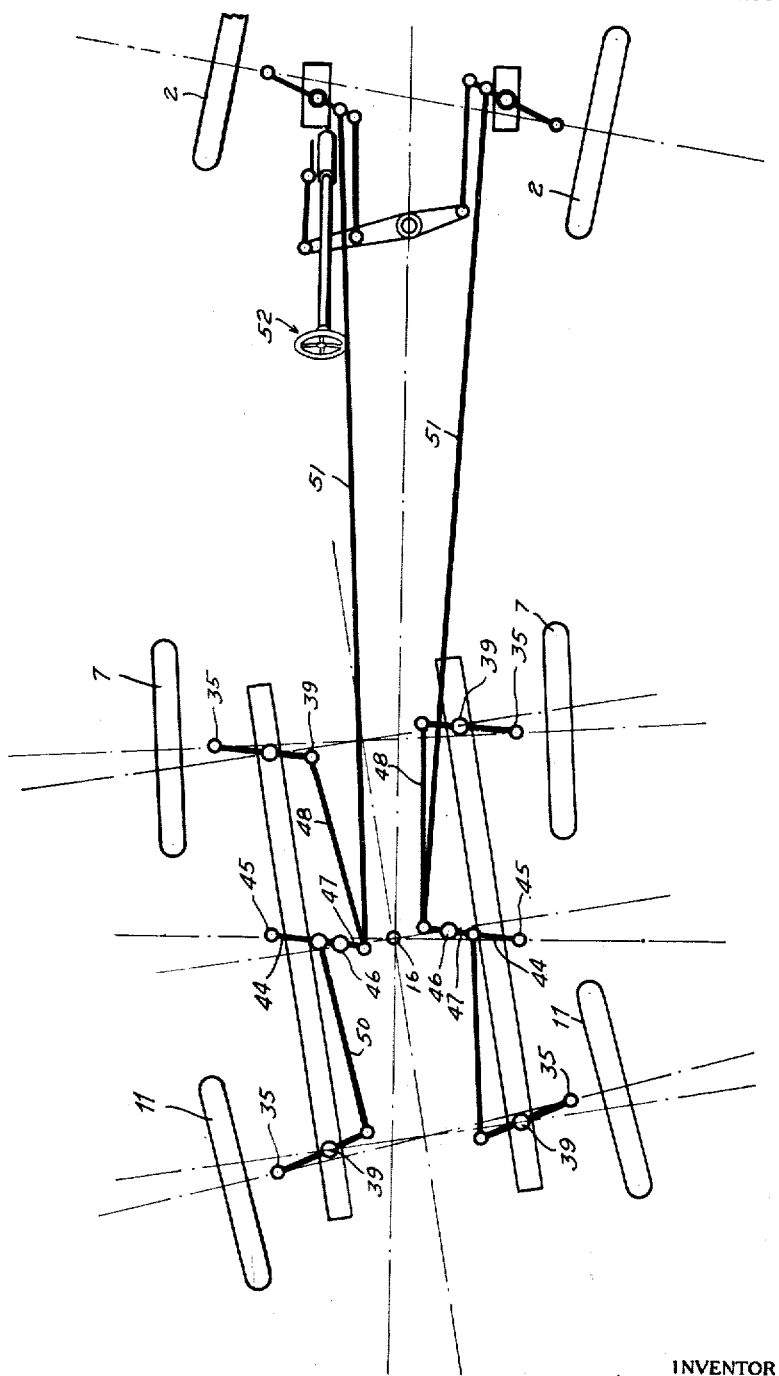

Patented Dec. 26, 1933

1,940,798

UNITED STATES PATENT OFFICE 1,940,798

RUNNING GEAR FOR ROAD VEHICLES

William T. Hanna, Cincinnati, Ohio

Application August 1, 1930, Serial No. 472,346
Renewed February 15, 1933

24 Claims. (Cl. 280—80)

This invention relates to running gear or trucks for road vehicles, and more particularly to trucks having rigid axles or axle frames for a wheel mounting which is constantly in square with the axle, said truck or running gear being adapted either for driving or trailing and said axles being qualified for steering.

One of the objects thereof is to provide a truck of the nature described, each wheel of which will at all times be maintained in efficient tractice contact with the ground passed over even though the ground be rough or of uneven surface contour. Another object is to provide a truck of the nature described, having effective means for sustaining the weight of the load below the axle level.

Another object is to provide a truck for a road vehicle which is universally movable with respect to the said vehicle and the axles of which are also universally movable with respect to the truck. Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

Referring to the drawings,

Figure 1 is a top plan view of the improved truck or motor vehicle chassis.

Figure 2 is a side view thereof with the wheels shown in dotted lines and the wheel-carrying portions of the axles shown in section.

Figure 3 is a section on line 3—3 of Figure 1.

Figure 4 is a section on line 4—4 of Figure 1.

Figure 5 is a section on line 5—5 of Figure 1.

Figure 6 shows the application of the chassis constituting this invention to another vehicle to constitute a six-wheel vehicle employing the wheels of the chassis as the load-supporting and driving wheels.

Figure 7 is a side elevation of the truck as applied to a vehicle body and illustrates the position of the parts when the wheels travel over an inclined undulating roadway.

Figure 8 is a top plan view of the motor vehicle, diagrammatic in character, to show the improved chassis or truck disposed at an angular relation with respect to the forward steering wheels of the vehicle.

Figure 9 is a diagrammatic view of the vehicle making a curve.

Figure 10 is a diagrammatic view showing steering connections between the front and rear steering systems of the vehicle.

In its present embodiment this invention constitutes a four-wheel driving unit for a motor vehicle, all of the wheels thereof being employed for propelling and arranged in driving power connection with the engine and transmission of the vehicle. It is to be understood, however, that the truck may be utilized for a trailer either with or without driving wheels. The driving or transmission mechanism may be of any suitable or general type. The details of construction thereof not being essential to the present invention, the present disclosure is to be considered as merely illustrative. No brake mechanism is disclosed herein as such mechanism forms no part of the present invention.

Referring to the drawings as illustrated in Figure 6, the chassis or underframe provides a swivelling truck to carry and guide the rear end of a motor vehicle body 1, shown as of the freight-carrying type, the forward end of the body carrying the engine and transmission and steering wheels 2 and representing any commercial type of construction. A propeller shaft 3 extends from the transmission housing within a casing 4 at the forward end of the vehicle to the transmission elements of the truck for driving the truck wheels. The driving shaft 3 has the usual universal joint at its opposite ends, with its rear end connecting with gearing housed within the middle portion 5, see Figure 1, of the axle 6 of the first or front set of driving wheels 7—7 of the truck. The said gearing, which is not shown, connects with the transverse shafts for the front set of truck wheels 7—7 and with an intermediate shaft 8 through a universal joint for transmitting power to transmission gearing housed within the middle portion 9 of the axle 10 for a second or rear set of driving wheels 11—11 of the truck. A universal joint 12 is interposed between the ends of said shaft 8 and the gearing within the second axle 10, and the second axle 10 also carries transverse shafts for the wheels 11—11.

The axles 6 and 10 conform to a well-known design of commercial automobile rear axle, except for such slight alterations and additions as become necessary to adapt the same for the use herein exemplified. By employing a solid or integral structure axle for each set of wheels, with the axles and their carrying springs swivelling and pivotally suspending the truck frame structure, the frame is relieved of all stresses and strains due to road irregularities and to turning curves, and this permits all possible movements of the wheels without subjecting any of the parts to torsional stresses. The wheels are so placed that on turning curves they will track perfectly and avoid side-slip. Solid axles, as compared with pivoted stub axles, mount the wheels more efficiently for driving purposes by bringing the wheels in more direct connection with the power plant of the vehicle. In turning curves the axles are swung through connections with the vehicle body frame so as to lie along appropriate radius lines of the curve, enabling the wheels of each axle to follow the curves while remaining parallel one to another. The swing of the axles for steering is based on such a minimum curve radius, as for instance, 30 feet, as to insure that the relative angularity of the driving shafts will not be too great for efficient propelling or traction.

The truck or chassis includes a pair of side frames hung or suspended respectively from springs fixed to the axles, with intervening universal connections, providing for relative vertical and horizontal movement between the side frames and axles. The side frames are pivotally mounted in a balanced symmetrical fashion upon a bolster and fifth wheel mechanism by means of a ball joint which provides not only for an extended vertical swing of the frame to accommodate it to inequalities of the ground between the front and rear wheels of the vehicle, but also provides for a limited transverse swing of the frame to take care of inequalities transversely of the vehicle and thus avoid torsional strains.

The truck is connected to a car frame 13, see Figures 4 and 6, built up of structural steel plates, angle and channel beams, a construction common in the manufacture of car frames of large tonnage capacity. This connection is made by means of an upper bolster or cross-beam 14 which is rigidly fixed to the car frame 13. This bolster is built up of structural steel parts riveted together and to the car frame, and is provided with an upper fifth wheel plate 15 rigidly fixed to or forming part of the said upper bolster. The upper fifth wheel plate 15 has hubs extending from opposite sides thereof to provide an extended bearing for the king pin 16 connecting said upper fifth wheel plate 15 with a lower fifth wheel plate 17 having a central socket for the reception of the tapering hub portion 18 extending from the lower side of the fifth wheel member 15. The lower fifth wheel member or plate 17 is rigidly secured to a lower bolster or cross beam 19 which comprises a pair of plates rigidly secured together in a spaced relation by the lower fifth wheel member, journal brackets 20—20 disposed laterally with respect to the center of the lower fifth wheel member 17, and end blocks 21—21 disposed between the downwardly and oppositely extending ends of the cross plates. Blocks 21 are each provided with a trunnion 22 upon which the side frames of the truck 23—23 are fulcrumed. As the side frames and parts connecting the said frames to the axles are of duplicate construction, the detailed description of the parts will be confined to the singular and for one side of the truck.

An offset tubular shackle 24 is engaged upon the trunnion 22 forming a bushing and seat for a ball journal collar 25, upon which the socket end 26 of a side frame hanger 27 is pivotally engaged. The socket 26 is of two-part form providing a removable cap element 26ª to facilitate assembling. Side frame hanger 27 is a casting having diverging arms 27ª extending upwardly and inwardly from the socket end 26 and diverging arms 27ᵇ extending downwardly and inwardly from said socket end. These arms 27ª and 27ᵇ provide a rigid connection with the side frame 23 which is a bar-formed structure shaped to approximately rectangular outline and having a central yoke bar 28 connecting upper and lower longitudinal bars thereof. These side frames may be of any particular design to give the necessary stability and service, and include principles attained in the development of side frames in the railway car art.

The shackle 24 provides an offset depending sleeve extension into which one end of a cross-tie rod 29 is fixed, the opposite end of the tie rod 29 being connected with a bracket 30 fixed upon the lower longitudinal bar of the side frame upon the opposite side of the truck. Thus, two tie rods are employed in substantially parallel arrangement, each extending from an end of the lower bolster to the opposite side frame, thus securing the side frames medially against lateral displacement and allowing the two side frames to swing in vertical planes independently of each other upon their respective axes. The tie rods swing as a unit with the side frame to which they are respectively connected. The forward ends of the side frames are connected adjacent opposite ends of the front axle 6 and the rearward ends of said frames are connected adjacent opposite ends of the rear axle 10 by means of springs and mechanism providing universal connections. As these mechanisms are the same for each axle adjacent to each wheel, the detailed description of the parts thereof will be confined to the singular.

A semi-elliptic spring 31 is rigidly fixed to the upper side of the axle in a usual manner and its ends are pivotally connected to the upturned ends of a U-shaped cradle or hanger 32, which is thus suspended from the spring with the bottom of the U disposed beneath the axle. One end of the spring pivotally connects to a fixed point at one end of the cradle 32 and the other end to a shackle 33 which is pivotally connected to the opposite end of the cradle. The springs are positioned with respect to the axles adjacent the wheels and extend parallel with the truck side frames. The cradle is preferably built of a pair of spaced plates secured together and forming a unit having a longitudinal axis alined with the longitudinal axis of the spring to which the cradle is secured. The lower part of the cradle, in line with the center of the axle, is provided with an upturned ball socket 34 for seating or journaling a ball 35, extending downwardly from a laterally extending end of a lever 36, which lever is provided with upwardly and inwardly extending arms 37—37 and downwardly and inwardly extending arms 40—40. Upwardly extending arms 37—37 are pivotally connected at their ends to the upper portion of a yoke saddle 38 pivotally mounted on a vertical axis between the upper and lower longitudinal bars of the truck side frame by means of medially arranged pintles 39—39 respectively engaged in bearings in said upper and lower bars. Thus are the side frames connected with the axles so as to permit the axles to swing or move horizontally in one direction with respect to the frame by means of the pivotal action of the yoke saddle on the frame, and horizontally in another direction by means of the ball and socket joint 34—35 connecting the cradle and the steering lever 36. Thus, each end of each axle is connected to its respective side frame to provide universal movement horizontally, which action also allows for the vertical vibrating motions of the cradle, springs and axle. The depending ear 40 of the steering lever or shackle 36 provides a pivotal connection for a radius bar or rod 41, as is clearly shown in Figure 5, the opposite end of which bar 41 is pivotally connected to the upper end of the opposed yoke saddle 38 at the opposite end of the axle, such end connection being co-axial with the axis connecting the yoke saddle and its connected steering lever 36—37.

Thus, the upper end of the yoke saddle and steering lever at each end of an axle is connected to the lower arm of the steering lever upon the other end of the axle. These radius bars add stability to the structure and provide a double pivotal connection for the steering levers 36 with the side frames, one for sustaining the load and the second for sustaining back and side thrusts. They adjust the parts to the irregularities of the road, equalize the strains and eliminate any spreading tendency of the running gear organization, under the weight of the load or through the effects of side thrusts from the wheels. Furthermore, these double pivotal conections in no wise interfere with the independence of the relative movements of shackles and associated parts at either end of the axles. As shown in Figure 5, the tie rods for the forward end of the truck have an annular medial portion 42 providing an opening through which the drive shaft extends, but such provision is not necessary when no intersecting shaft is employed.

In the construction shown in Figures 1 to 9 inclusive, the steering movements are given to the axles automatically and directly from the vehicle body frame 13, which is provided at its opposite sides and in central alinement with the axis of the bolster 14 with a pair of laterally extending arms 43—43 rigidly fixed to said bolster 14. These two arms are conveniently employed for making a steering connection with the two axles at opposite ends thereof for equalizing purposes, to reduce the leverage and obtain more ease in steering. The connections between arms 43 and yoke saddles 38 at one end of the axles are the duplicates of those for the opposite end of the axles except that they operate relatively in opposite directions. Thus the arms 43 connect respectively to the free end of the crank arm 44 by means of a pin 45 which engages an oblong slot in said arm 44. Crank arm 44 is fixed upon a rock shaft 46 journaled in one of the brackets 20 mentioned above. Upon the lower end of the rock shaft 46 is mounted a lever 47 having oppositely extending arms. One of said arms connects pivotally, through a ball and socket joint, with a reach rod 48 which at its other end is connected through a ball and socket joint with an arm 49 fixed to the yoke saddle 38 for one of the axles of the truck, say the forward axle. The second arm of said lever 47 connects with a reach rod 50 through a ball and socket joint, the reach rod extending rearwardly and connecting through a ball and socket joint with an arm 49, connecting with the yoke saddle 38 at one end of the rear axle of the truck. For the purpose of identification, one of the axles is designated as the fore axle and the second as the rear axle, this being the relation the two will bear to one another when the truck is applied to a vehicle body as the rear support thereof.

With the steering connections just described it will be seen that whenever the vehicle body frame is moved to an angular position from a normally straight line of travel, as when going around a curve, the arms 43—43 moving with the upper bolster 14 swing the crank levers 44—44 and lever 47—47 so as to cause a swivelling of the yoke saddles 38 through the connecting reach rods. Reach rods 48—48 for the fore axle connect with the inner arms of the levers 47—47, while the reach rods 50—50 for the rear axle connect with the outer arms of said levers 47—47. With this steering arrangement the movement of the car body relative to the truck frame in an angular direction results in a movement of the rods 48 and 50 upon one side of the truck in opposite directions to force the corresponding ends of the axles either further apart or draw them nearer together, as the case may be, while simultaneously the opposite action is taking place upon the other side of the truck by reason of the action of the rods 48 and 50 upon the ends of the axle at said opposite side of the truck. Thus, assuming that the vehicle is making a right-hand turn, the truck axles and wheels will be under a steering control as illustrated in Figure 9, the lever action causing a movement of the axles to radial position with reference to the curve, so that the right-hand ends of the axles are moved toward each other and the left-hand ends of the axles are moved away from each other or vice versa, as an opposite curve is made.

In turning, the wheels on one side of the truck track a common circle and likewise the wheels on the opposite side of the truck track a common circle. This is true for either backward or forward travel of the vehicle. It will be understood that one set of steering connections for each axle may serve to effect proper steering, but by duplicating the same upon the other side of the truck, the construction is made more symmetrical and a balanced condition is established, producing many advantages of operation. Among these may be noted freedom of operation, a minimizing of torsion effects and a reduction of vibration and chatter in the steering mechanism. Also, both wheels on each axle are maintained perpendicular to the same radius and parallel to each other.

The steering mechanism above described is readily adaptable for manually steering from the forward end of the vehicle, as shown in Figure 10, where pull rods 51—51 connect with the steering wheel 52 through the steering mechanism for the front axle or wheels of the vehicle. The pull rods connect respectively with the rock levers 47—47, preferably at the inside ends thereof through ball and socket connections, co-axial with the ball and socket connections for the rods 48—48. Various forms of axle structure may be employed within the scope of the present invention so long as the actual structure comprises a rigid cross-element mounting wheels on the square with the longitudinal axis of said cross-element, so as to maintain the wheels in parallelism, the said wheels and axle structure being designed to swing as a unit for steering.

Applicant's connection between the rigid axle structure and the running gear frame adapts such axle structure for organization in truck or undercarriages for road vehicles, with any or all of the wheels utilized either for driving or for trailing, and such truck or undercarriage may be utilized either for the front or rear end of the vehicle.

The mechanism connecting the axle or axle casing to the running gear frame, constituting as it does a universal connection between these parts, permits all possible movements of the wheels without any of the parts being subjected to torsional strains. One end of the axle may be moved vertically to accommodate for road inequalities which are not present at the other end of the axle, and vertical movement of each of the wheels relatively with respect to each of the other wheels is possible without any wheel being raised from the ground.

The ball joints for pivotally connecting the forwardly and rearwardly balanced side frames to the lower bolster accommodate and take care of torsional reactions as the other wheels ride or travel over relatively different road inequalities such as are found under normal road conditions. As the wheels all remain upon the ground under such conditions, such a construction is quite advantageous in the use of the truck wheels as traction wheels. Constant contact of wheels with the ground suppresses part of the shock due to inequalities in the ground which would be suffered were the wheels allowed to leave the ground and then fall back into contact therewith. Also, whatever shock may be received at the end of a side frame, that is, at a wheel, is reduced in effect upon the vehicle because the displacement of the axis about which the side frame swings is proportionately less than the displacement of a wheel, and this without taking into consideration the yielding and swinging connections between the side frames and axles.

The duplex lever system for imparting the steering motion to the axle equalizes the force to opposite ends of the axles and also to the several axles in the truck organization and results in a material reduction in the power necessary to move the axles for steering, and in a coordination of movement so that there is no lagging tendency at any of the steering points.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

Having described my invention, I claim:

1. In a swivelling truck for motor vehicles, in combination, a bolster adapted to swivel upon the vehicle body and disposed transversely thereof, side frames independently fulcrumed upon said bolster and extending longitudinally of the vehicle body, axles disposed forwardly and rearwardly of said bolster, springs rigidly connected to said axles, and mechanism interposed between said springs and said side frames to provide a universal connection therebetween.

2. In a truck for motor vehicles, in combination, a bolster adapted to swivel upon the vehicle body and disposed transversely thereof, longitudinally extending side frames having ball and socket connections with said bolster at opposite ends thereof, axle structures disposed at opposite ends of the side frames, springs connected to said axle structures for yieldingly suspending said side frames, and universal connections interposed between said springs and said side frames adapting the side frames to swing independently of each other for maintaining all of the wheels of said axle structures in contact with the ground.

3. In a truck for motor vehicles, in combination, a swivelling bolster, longitudinal side frames balanced about a fulcrum on said bolster, axle structures at opposite ends of the side frames carrying springs suspending said side frames and adapting the side frames to swing independently of each other for maintaining all of the wheels of the axle structures in contact with the ground, and cross-tie rods connecting respectively the side frame on one side of the vehicle to the said bolster adjacent the frame of the opposite side of the vehicle.

4. In a truck for motor vehicles, in combination, a bolster extending transversely of said vehicle body, longitudinal side frames balanced about a fulcrum on said bolster, axle structures carrying springs suspending said side frames, and means providing universal connections between said springs and said side frames, adapting said side frames to swing independently of each other for accommodating said truck to inequalities in the ground traveled while maintaining all wheels of said axle structures in contact with the ground.

5. In a truck for motor vehicles, in combination, a fifth wheel having trunnions extending therefrom, side frames respectively swivelling upon said trunnions, and axle structures carrying springs connecting with said side frames, the connections between the springs and side frames adapting the side frames to swing independently of one another for maintaining the wheels of the axle structures in contact with the ground.

6. In a swivelling wheeled carriage for vehicles, in combination, a swivelling bolster comprising an upper cross-member adapted to be rigidly secured to a body frame of the vehicle, a lower cross-member pivotally secured to the upper member, side frames respectively fulcrumed on the opposite ends of said lower bolster member, and a tie rod connecting at one end with a side frame upon one side of the vehicle and at the other end with the end of the said lower bolster member.

7. In a swivelling wheeled carriage for vehicles, in combination, a swivelling bolster comprising an upper member adapted to be rigidly secured transversely to a vehicle body frame, a lower member pivotally secured to the upper member, longitudinal side frames respectively pivotally mounted upon the opposite ends of said lower bolster member by a ball joint, a tie rod for each side frame having one end connected with the side frame and its opposite end with the lower bolster member at a side of the truck opposite its connection with the side frame, whereby the side frames are free to swing independently, axle structures and wheels for said side frames, and springs on said axle structures suspendingly sustaining the opposite ends of said side frames.

8. A running gear for road vehicles comprising, in combination, a steering axle structure having wheels constantly in square with the axle structure, semi-elliptic springs overslung on said axle structure respectively at the opposite ends thereof, underslung hangers connecting with the opposite ends of the springs for suspension of the vehicle on the springs, and universal connections for pivotally connecting the hanger to the vehicle and providing for movement of said axle structure to guide the wheels.

9. A running gear for road vehicles comprising, in combination, a rigid axle structure having wheels constantly in square with the axle structure, a running gear frame structure an underslung and yieldingly suspended means for providing universal connection between the running gear frame structure and the axle structure, and levers connecting the opposite ends of said axle structure to the running gear frame and providing a universal connection for permitting steering motion to said axle structure.

10. A running gear for road vehicles comprising, in combination, a rigid axle structure having wheels constantly in square with the axle structure, and a running gear frame structure and means for providing an underslung yieldingly suspended connection between the running gear frame structure and the respective ends of the axle structure, and pivoted levers connecting the opposite ends of said axle structure to the running gear frame movable for imparting steering motion to said axle structure.

11. In a swivelling truck for road vehicles, in combination, a bolster adapted to swivel upon the body of said vehicle, longitudinally balanced side frames fulcrumed on said bolster for independent movement in vertical planes, rigid axle structures for the opposite ends of said side frames, springs on said axle structures for suspending said side frames, levers forming steering connections between each of said side frames and said axle structures, and steering rods connecting the levers in pairs to intermediate levers for coordinating steering movements of said axle structures in order that the wheels upon the same side of the vehicle will be constrained to track the same circle when the vehicle makes a turn.

12. In a truck for motor vehicles, in combination, a pair of rigid axle structures having wheels mounted thereon, a pair of springs carried by each axle positioned respectively adjacent one of said wheels, a truck frame comprising a pair of side frames, each of which has a universal connection at each of its ends with one of said springs, each of said universal connections including a lever permitting swivelling of said axle structures to give the truck dirigibility, and means connected to the lever of one of said universal connections for swivelling one of said axle structures through an angle in one direction, said means being also connected to the lever of another of said universal connections for simultaneously swivelling the other of said axle structures through an equal angle in the opposite direction.

13. In a truck for motor vehicles, in combination, a pair of rigid axle structures having wheels mounted thereon, a pair of springs carried by each axle positioned respectively adjacent one of said wheels, a truck frame comprising a pair of side frames, each of which has a universal connection at each of its ends with one of said springs, each of said universal connections including a lever permitting swivelling of said axle structures to give the truck dirigibility, means connected to the lever of one of said universal connections for swivelling one of said axle structures through an angle in one direction, said means being also connected to the lever of another of said universal connections for simultaneously swivelling the other of said axle structures through an equal angle in the opposite direction, and means for actuating said first means to produce turning of said motor vehicle.

14. A running gear for road vehicles, comprising at least two rigid axle structures, wheels mounted on said axle structures and constantly in substantially square relationship with said structures, springs mounted on the ends of said axles, a running gear frame, and means connecting said running gear frame and said springs, cross-radius elements pivotally mounted on said running gear frame adjacent said axles, a second set of cross-radius elements pivoted on said frame, respective ends of said first-named cross-radius elements connected with respective ends of said second set of cross-radius elements, the other ends of said first-named cross-radius elements being connected with said means connecting said running gear frame and said springs, whereby any pivotal movement of one of said axle structures, in the plane of said running gear frame, and with respect to said frame will be transferred to the other of said axle structures.

15. In a truck for vehicles, in combination, a bolster, a running gear pivotally connected to said bolster comprising a running gear frame, a plurality of axle structures, and means providing universal connections between said running gear frame and said axle structures; a cross-radius element pivotally mounted on said bolster, and at least one individual cross-radius element associated with each axle and mounted on said running gear frame, and the respective ends of said cross-radius element on said bolster connected with respective ends of said other cross-radius elements, and the other ends of said last-mentioned cross-radius elements being connected with said axle structures through said universal connection means, whereby pivotal movement of one of said axle structures in the plane of said running gear frame and with respect to said running gear frame is transferred to the other of said axle structures, and said cross-radius element mounted on said bolster also having a connection with said vehicle body, whereby as said bolster pivots with respect to said vehicle body said axle structures are pivoted with respect to said running gear frame, said bolster and cross-radius element mounted thereon acting as a central distributing point for the steering of said axles as said bolster moves with respect to said vehicle body.

16. In a truck for motor vehicles, in combination, a swiveling bolster, comprising an upper cross-member rigidly secured to the body frame of a vehicle, a lower bolster cross-member pivotally secured to the upper member, trunnions extending from either end of said lower bolster, sleeve members mounted on said trunnions, and side frame members also respectively independently fulcrumed on the trunnions, said sleeve members serving as bushings between said side frame members and said trunnions, and a tie rod connected at one end with a side frame on one side of said vehicle, and at the other end with the sleeve member at the opposite side of said vehicle, whereby said side frame receives lateral support from the opposite end of the bolster on which it is fulcrumed, but with respect to which it may move freely in a vertical plane.

17. In a truck for motor vehicles, in combination, a swiveling bolster, comprising an upper cross member rigidly secured to the body frame of a vehicle, a lower bolster cross member pivotally secured to the upper member, trunnions extending from either end of said lower bolster, sleeve members mounted on said trunnions, and side frame members also respectively independently fulcrumed on the trunnions, said sleeve members serving as bushings between said side frame members and said trunnions, and a tie rod connected at one end with a side frame on one side of said vehicle, and at the other end rotatably connected to the said sleeve member at the opposite side of said vehicle, whereby said side frame receives lateral support from the opposite end of the bolster on which it is fulcrumed, but with respect to which it may move freely in a vertical plane.

18. In a truck for motor vehicles, in combination, a swiveling bolster, comprising an upper cross member rigidly secured to the body frame of a vehicle, a lower bolster cross member pivotally secured to the upper member, side frame members respectively independently fulcrumed on either end of said lower bolster, and a tie rod connected at one end with a side frame upon one side of said vehicle, and the other end rotatably connected with the end of the lower bolster at the opposite side of said vehicle, the end of said tie rod connected to said bolster being substantially in alignment with the axis about which said side frame member is fulcrumed, whereby said side frame receives lateral support from the opposite end of the bolster on which it is fulcrumed, but with respect to which it may move freely in a vertical plane.

19. In a truck for motor vehicles, in combination, a bolster extending transversely of said vehicle body, side frames fulcrumed on either end of said bolster, each side frame comprising an upper and lower member rigidly joined together, axle structures carrying springs, and a universal connection between said springs and said side frames, each universal connection comprising a hanger shackled to its respective spring, a lever universally connected at one end to said hanger, and a yoke saddle pivotally mounted within the upper and lower members of the side frame, the non-universally connected end of said lever being pivotally connected to said yoke saddle.

20. In a truck for motor vehicles, in combination, a bolster extending transversely of said vehicle body, side frames fulcrumed on either end of said bolster, each side frame comprising an upper and lower member rigidly joined together, axle structures carrying springs, and a universal connection between said springs and said side frames, each universal connection comprising a hanger shackled to its respective spring, a lever universally connected to said hanger, and a yoke saddle pivotally supported between the upper and lower members of said side frame, said lever also being pivotally connected to said yoke saddle whereby a universal connection is completed between said spring and said side frame.

21. In a truck for motor vehicles, in combination, a bolster extending transversely of said vehicle body, side frames fulcrumed on either end of said bolster, each side frame comprising an upper and lower member rigidly joined together, axle structures carrying springs, and a universal connection between said springs and said side frames, each universal connection comprising a hanger shackled to its respective spring, a lever universally connected to said hanger, a yoke saddle pivotally supported between the upper and lower members of said side frame, said lever also being pivotally connected to said yoke saddle whereby a universal connection is completed between said spring and said side frame, and cross tie rods respectively connecting the yoke saddle of the side frame on one side of said vehicle with the lever associated with the same axle, but on the opposite side of said vehicle.

22. In a truck for a motor vehicle having a vehicle body, in combination, a bolster adapted to swivel with respect to the vehicle body, side frames independently fulcrumed upon said bolster, axles disposed forwardly and rearwardly of said bolster, and mechanism interposed between said axles and side frames to provide a universal connection therebetween.

23. In a truck for motor vehicles, in combination, a vehicle body, a bolster pivotally connected with said body, trunnions extending from said bolster, side frames on said trunnions axle structures for mounting wheels for said vehicle and means connecting said axles and side frames for allowing the side frames to swing independently of one another for maintaining the wheels of the axle structures in contact with an uneven road bed.

24. In a truck for motor vehicles, in combination, a bolster pivotally mounted on a body of said motor vehicle, side frames independently fulcrumed on either end of said bolster, a plurality of axle structures having wheels mounted for rotational movement in planes perpendicular to said axles; universal connections between each axle and each side frame, and cross-tie rods connecting the respective universal connections of each axle to cause the complement of the movement of any one axle with respect to one of the side frames to be produced with respect to the other side frame.

WILLIAM T. HANNA.

CERTIFICATE OF CORRECTION.

Patent No. 1,940,798.                         December 26, 1933.

WILLIAM T. HANNA.

It is hereby certified that error appears in the printed specification of the above numbered patent requiring correction as follows: Page 1, lines 10-11, for "tractice" read tractive; page 4, line 116, claim 6, after "member" insert the words at the opposite side of said vehicle; page 6, line 105, claim 23, after "trunnions" insert a comma; and that the said Letters Patent should be read with these corrections therein that the same may conform to the record of the case in the Patent Office.

Signed and sealed this 13th day of March, A. D. 1934.

F. M. Hopkins (Seal)                                         Acting Commissioner of Patents.

with respect to which it may move freely in a vertical plane.

18. In a truck for motor vehicles, in combination, a swiveling bolster, comprising an upper cross member rigidly secured to the body frame of a vehicle, a lower bolster cross member pivotally secured to the upper member, side frame members respectively independently fulcrumed on either end of said lower bolster, and a tie rod connected at one end with a side frame upon one side of said vehicle, and the other end rotatably connected with the end of the lower bolster at the opposite side of said vehicle, the end of said tie rod connected to said bolster being substantially in alignment with the axis about which said side frame member is fulcrumed, whereby said side frame receives lateral support from the opposite end of the bolster on which it is fulcrumed, but with respect to which it may move freely in a vertical plane.

19. In a truck for motor vehicles, in combination, a bolster extending transversely of said vehicle body, side frames fulcrumed on either end of said bolster, each side frame comprising an upper and lower member rigidly joined together, axle structures carrying springs, and a universal connection between said springs and said side frames, each universal connection comprising a hanger shackled to its respective spring, a lever universally connected at one end to said hanger, and a yoke saddle pivotally mounted within the upper and lower members of the side frame, the non-universally connected end of said lever being pivotally connected to said yoke saddle.

20. In a truck for motor vehicles, in combination, a bolster extending transversely of said vehicle body, side frames fulcrumed on either end of said bolster, each side frame comprising an upper and lower member rigidly joined together, axle structures carrying springs, and a universal connection between said springs and said side frames, each universal connection comprising a hanger shackled to its respective spring, a lever universally connected to said hanger, and a yoke saddle pivotally supported between the upper and lower members of said side frame, said lever also being pivotally connected to said yoke saddle whereby a universal connection is completed between said spring and said side frame.

21. In a truck for motor vehicles, in combination, a bolster extending transversely of said vehicle body, side frames fulcrumed on either end of said bolster, each side frame comprising an upper and lower member rigidly joined together, axle structures carrying springs, and a universal connection between said springs and said side frames, each universal connection comprising a hanger shackled to its respective spring, a lever universally connected to said hanger, a yoke saddle pivotally supported between the upper and lower members of said side frame, said lever also being pivotally connected to said yoke saddle whereby a universal connection is completed between said spring and said side frame, and cross tie rods respectively connecting the yoke saddle of the side frame on one side of said vehicle with the lever associated with the same axle, but on the opposite side of said vehicle.

22. In a truck for a motor vehicle having a vehicle body, in combination, a bolster adapted to swivel with respect to the vehicle body, side frames independently fulcrumed upon said bolster, axles disposed forwardly and rearwardly of said bolster, and mechanism interposed between said axles and side frames to provide a universal connection therebetween.

23. In a truck for motor vehicles, in combination, a vehicle body, a bolster pivotally connected with said body, trunnions extending from said bolster, side frames on said trunnions axle structures for mounting wheels for said vehicle and means connecting said axles and side frames for allowing the side frames to swing independently of one another for maintaining the wheels of the axle structures in contact with an uneven road bed.

24. In a truck for motor vehicles, in combination, a bolster pivotally mounted on a body of said motor vehicle, side frames independently fulcrumed on either end of said bolster, a plurality of axle structures having wheels mounted for rotational movement in planes perpendicular to said axles; universal connections between each axle and each side frame, and cross-tie rods connecting the respective universal connections of each axle to cause the complement of the movement of any one axle with respect to one of the side frames to be produced with respect to the other side frame.

WILLIAM T. HANNA.

CERTIFICATE OF CORRECTION.

Patent No. 1,940,798.    December 26, 1933.

WILLIAM T. HANNA.

It is hereby certified that error appears in the printed specification of the above numbered patent requiring correction as follows: Page 1, lines 10-11, for "tractice" read tractive; page 4, line 116, claim 6, after "member" insert the words at the opposite side of said vehicle; page 6, line 105, claim 23, after "trunnions" insert a comma; and that the said Letters Patent should be read with these corrections therein that the same may conform to the record of the case in the Patent Office.

Signed and sealed this 13th day of March, A. D. 1934.

F. M. Hopkins (Seal)    Acting Commissioner of Patents.